United States Patent

Ushirozawa

[11] Patent Number: 5,917,639
[45] Date of Patent: Jun. 29, 1999

[54] OPTICAL RECEIVER

[75] Inventor: Mizuyuki Ushirozawa, Tokyo, Japan

[73] Assignee: NEC Corporation, Tokyo, Japan

[21] Appl. No.: 08/639,447

[22] Filed: Apr. 29, 1996

[30] Foreign Application Priority Data

May 1, 1995 [JP] Japan ................................. 7-107640

[51] Int. Cl.$^6$ .................................................. H04B 10/06
[52] U.S. Cl. ...................... 359/194; 359/189; 250/201.1; 250/214 AG; 330/308
[58] Field of Search .................................. 359/177, 174, 359/175, 110, 189, 194, 193; 330/308, 59; 250/214 AG, 201.1

[56] References Cited

U.S. PATENT DOCUMENTS

| | | | |
|---|---|---|---|
| 4,495,410 | 1/1985 | Minami et al. ................. | 250/214 AG |
| 4,499,609 | 2/1985 | Muska ...................................... | 455/619 |
| 4,750,217 | 6/1988 | Smith et al. ............................. | 455/619 |
| 4,870,369 | 9/1989 | Bartenstein et al. ...................... | 330/59 |
| 5,015,839 | 5/1991 | Tanikoshi ........................ | 250/214 AG |
| 5,113,151 | 5/1992 | Yamamoto et al. .................... | 330/308 |
| 5,625,181 | 4/1997 | Yasuda ................................ | 250/214 A |

*Primary Examiner*—Leslie Pascal
*Attorney, Agent, or Firm*—Whitham, Curtis & Whitham

[57] ABSTRACT

In an optical receiver including an avalanche photodiode (APD), a monitor circuit monitors the operating point of a preamplifier. A bias control circuit usually transfers a control signal received from an AGC (Automatic Gain Control) control circuit to an APD bias circuit. When the value being monitored by the monitor circuit exceeds a preselected level, the bias control circuit controls the APD bias circuit such that the above value coincides with the preselected level. The various sections of the receiver are free from damage ascribable to an increase in the photocurrent of the APD.

13 Claims, 4 Drawing Sheets

5,917,639

OPTICAL RECEIVER

BACKGROUND OF THE INVENTION

The present invention relates to an optical receiver and, more particularly, to an optical receiver using an avalanche photodiode (APD) as a photosensitive device.

An optical receiver of the type using an APD is conventional. This type of optical receiver includes an amplifier for amplifying the output of the APD. Usually, so long as the receipt level, i.e., the output level of the amplifier can be maintained constant by the control of the gain of the amplifier, the gain of the amplifier is controlled. When the gain of the amplifier becomes maximum, the multiplication ratio of the APD, i.e., a bias voltage applied to the APD, is changed in order to maintain the receipt level constant. The problem with the optical receiver is that the photocurrent of the APD is apt to become excessively great and damage the APD and a preamplifier following the APD. In light of this, Japanese Patent Laid-Open Publication No. 3-126335 discloses an optical receiver including a mechanism for monitoring the photocurrent of the APD, and when an excessive photocurrent is detected, stopping control of the bias voltage for the APD. Specifically, this optical receiver includes a photocurrent limit circuit implemented by a photocoupler and prevents an excessive photocurrent from flowing by monitoring the photocurrent via the photocoupler.

However, the above photocurrent limit circuit is not applicable to an optical receiver of the kind in which photocurrents, lying in a range difficult to be monitored by a photocoupler, have adverse influence on the various sections of the receiver. Moreover, a photodiode constituting the photocoupler has a current transfer ratio noticeably dependent on temperature and which deteriorates due to aging, so that it cannot operate stably over a long period of time. In addition, assume that a circuit comparable in function with the photocurrent limit circuit is implemented by use of an electronic device other than the photocoupler. Then, the electronic device must be one capable of withstanding a high APD bias voltage.

SUMMARY OF THE INVENTION

It is therefore an object of the present invention to provide an optical receiver capable of protecting its various sections from damage ascribable to an increase in the photocurrent of an APD, and having a simple configuration.

An optical receiver of the present invention has an APD for receiving an optical signal. A preamplifier amplifies an electric signal corresponding to the optical signal output from the APD. An amplifier amplifies the output of the preamplifier. A first control circuit controls the gain of the amplifier to thereby maintain a signal level output from the amplifier constant, and when the gain of the amplifier becomes maximum, controls the multiplication ratio of the APD to thereby maintain the signal level output from the amplifier constant. A photocurrent level detecting circuit estimates the operating state of the preamplifier to thereby detect the level of the photocurrent of the APD. A decision circuit determines whether or not the level of the photocurrent detected by the photocurrent level detecting circuit is higher than a preselected level. A second control circuit causes, when the photocurrent detected is higher than the preselected level, the first control circuit to stop controlling the multiplication ratio of the APD, and controls the multiplication ratio of the APD such that the level of the photocurrent detected by the photocurrent level detecting circuit remains at the preselected level.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
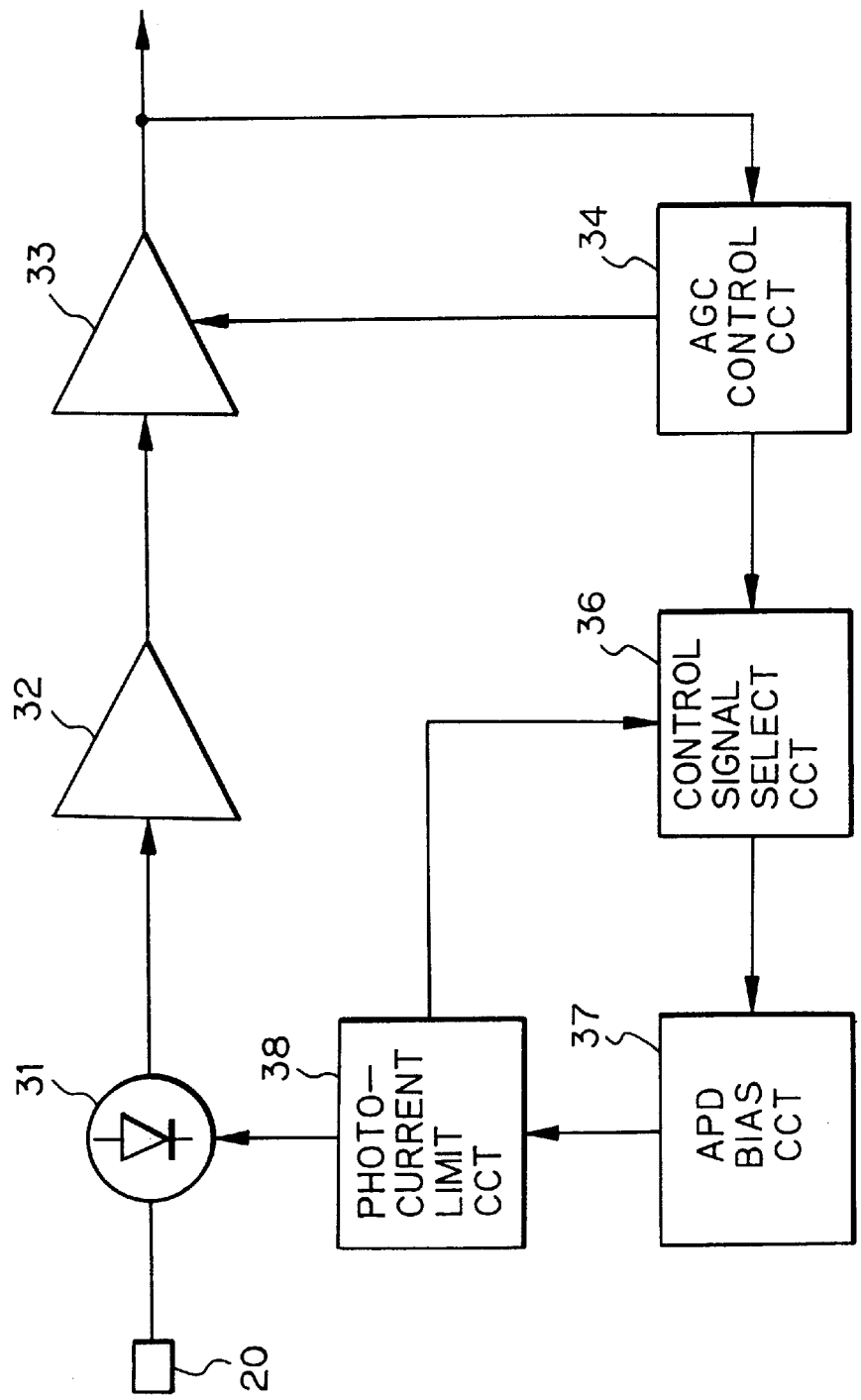
FIG. 1 is a block diagram schematically showing a conventional optical receiver.
Figure 2:
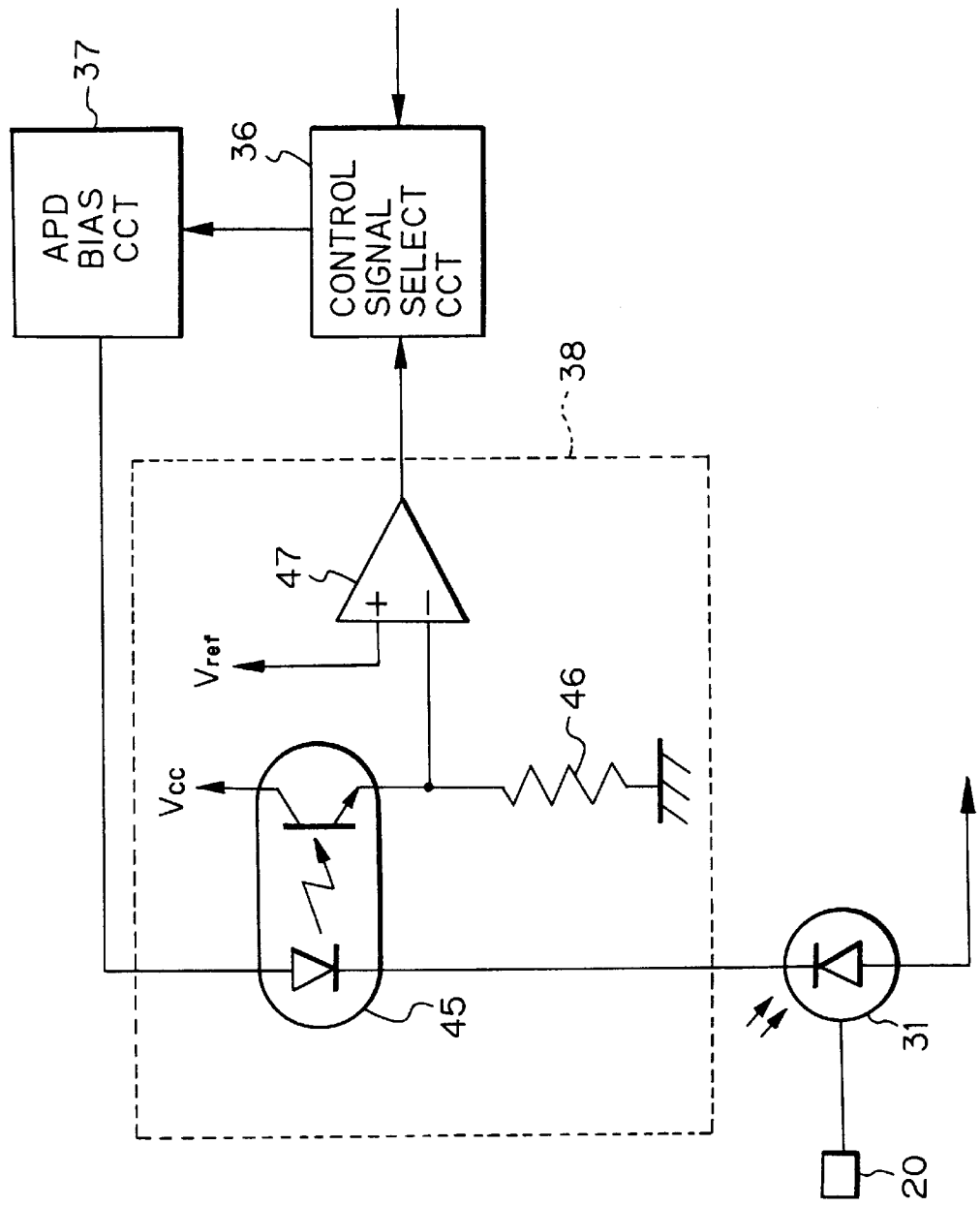
FIG. 2 is a circuit diagram showing a photocurrent limit circuit included in the receiver of FIG. 1 specifically.

To better understand the present invention, a brief reference will be made to a conventional optical receiver using an APD, shown in FIG. 1. The optical receiver to be described is disclosed in previously mentioned Japanese Patent Laid-Open Publication No. 3-126335. FIG. 2 shows a photocurrent limit circuit included in the receiver specifically. As shown in FIG. 1, the receiver has an APD 31, a preamplifier 32, an AGC (Automatic Gain Control) amplifier 33, an AGC circuit 34, a control signal select circuit 36, an APD bias circuit 37, and a photocurrent limit circuit 38. An optical signal input to an input terminal 20 is applied to the APD 31. The APD bias circuit 37 feeds a bias voltage to the APD 31. The APD 31 photoelectrically transduces the input optical signal with a multiplication ratio corresponding to the bias voltage. The resulting output of the APD 31 is sequentially amplified by the preamplifier 32 and AGC amplifier 33 and then output from the receiver.

The AGC control circuit 34 controls the gain of the AGC amplifier 33 such that the output of the amplifier 33 has a preselected value. At the same time, the control circuit 34 feeds a control signal of preselected level to the control signal select circuit 36. Further, when the gain of the AGC amplifier 33 becomes maximum, the control circuit 34 maintains the maximum gain and changes the level of the control signal output to the select circuit 36.

The control signal select circuit 36 selectively transfers the control signal received from the AGC control circuit 34 or a control signal received from the photocurrent limit circuit 38 to the APD bias circuit 37. In response, the APD bias circuit 37 applies a voltage varied in accordance with the level of the input control signal to the APD 31 via the photocurrent limit circuit 38 as a bias voltage.

The photocurrent limit circuit 38 monitors the photocurrent of the APD 31. As shown in FIG. 2, the circuit 38 has a photocoupler 45, a resistor 46, and an operational amplifier 47. It will be seen that the circuit 38 delivers to the control signal select circuit 36 a control signal corresponding to a difference between the monitored photocurrent and a preselected value. When an excessive photocurrent flows through the APD 31, the control signal select circuit 36 controls the multiplication ratio of the APD 31 with the control signal.

As stated above, the conventional optical receiver monitors the level of the photocurrent by use of the photocoupler 45 and thereby eliminates excessive photocurrents. Therefore, the photocurrent limit circuit 38 is not applicable to an optical receiver of the kind in which photocurrents lying in a range difficult to be monitored by a photocoupler have adverse influence on the various sections of the receiver. Moreover, a photodiode constituting the photocoupler has a current transfer ratio CTR noticeably dependent on temperature and which deteriorates due to aging, so that it cannot operate stably over a long period of time. In addition, assume that a circuit comparable in function with the photocurrent limit circuit 38 is implemented by use of an electronic device other than the photocoupler. Then, the electronic device must be one capable of withstanding a high APD bias voltage.

Figure 3:
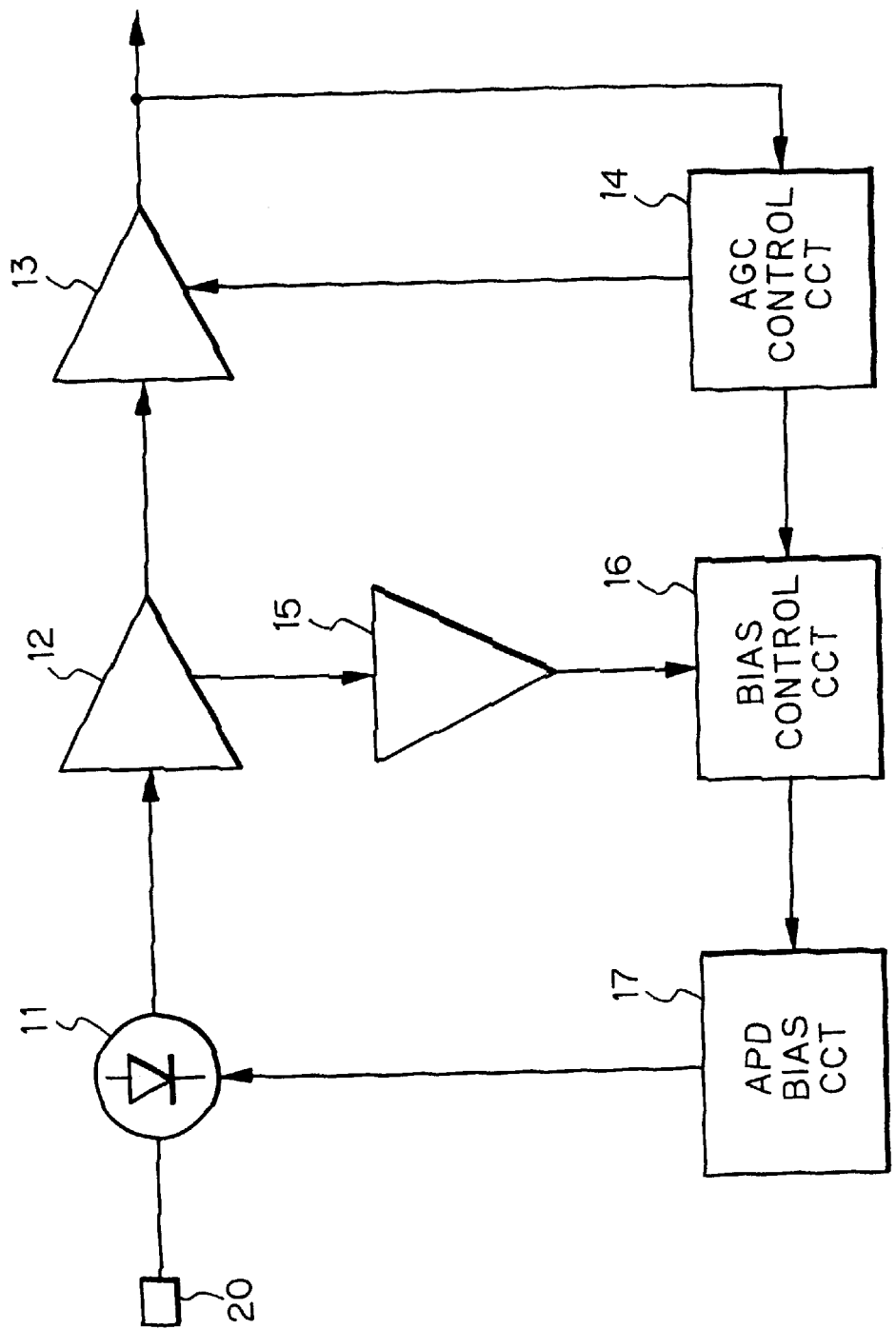
FIG. 3 is a block diagram schematically showing an optical receiver embodying the present invention.

Referring to FIG. 3, an optical receiver embodying the present invention is shown. As shown, the receiver has an APD 11, a preamplifier 12, an AGC amplifier 13, an AGC control circuit 14, a monitor circuit 15, a bias control circuit 16, and an APD bias circuit 17. An optical signal is applied to the APD 11 via an input terminal 20. The APD 11 photoelectrically transduces the input optical signal with a multiplication ratio corresponding to a bias voltage fed from the APD bias circuit 17. The output of the APD 11 is sequentially amplified by the preamplifier 12 and AGC amplifier 13 and then output from the receiver.

The AGC control circuit 14 controls the gain of the AGC amplifier 13 or the multiplication ratio of the APD 11 such that the output of the amplifier 13 has a preselected amplitude. If the control circuit 14 can maintain the output of the amplifier 13 at the preselected amplitude, it delivers to the bias control circuit 16 a control signal which provides the APD 11 with a preselected multiplication ratio, while controlling the gain of the amplifier 13. When the gain of the amplifier 13 becomes maximum, the control circuit 14 maintains the maximum gain and changes the level of the control signal. As a result, the control signal adjusts the multiplication ratio of the APD 11 and thereby maintains the amplitude of the output of the amplifier 13 constant.

The monitor circuit 15 monitors the operating point of the preamplifier 12. Specifically, the monitor circuit 15 feeds a voltage signal corresponding to the photocurrent of the APD 11 to the bias control circuit 16. In response, the bias control circuit 16 determines whether or not the input voltage signal has a level lower than a preselected level. If the answer of this decision is positive, the bias control circuit 16 transfers the control signal received from the AGC control circuit 14 to the APD bias circuit 17. If the answer of the above decision is negative, meaning that the level of the input voltage signal is not lower than the preselected level, then the bias control circuit 16 stops feeding the control signal output from the AGC control circuit 14 to the APD bias circuit 17; instead, it feeds a control signal to the bias circuit 17 such that the output of the monitor circuit 15 has a preselected level.

Figure 4:
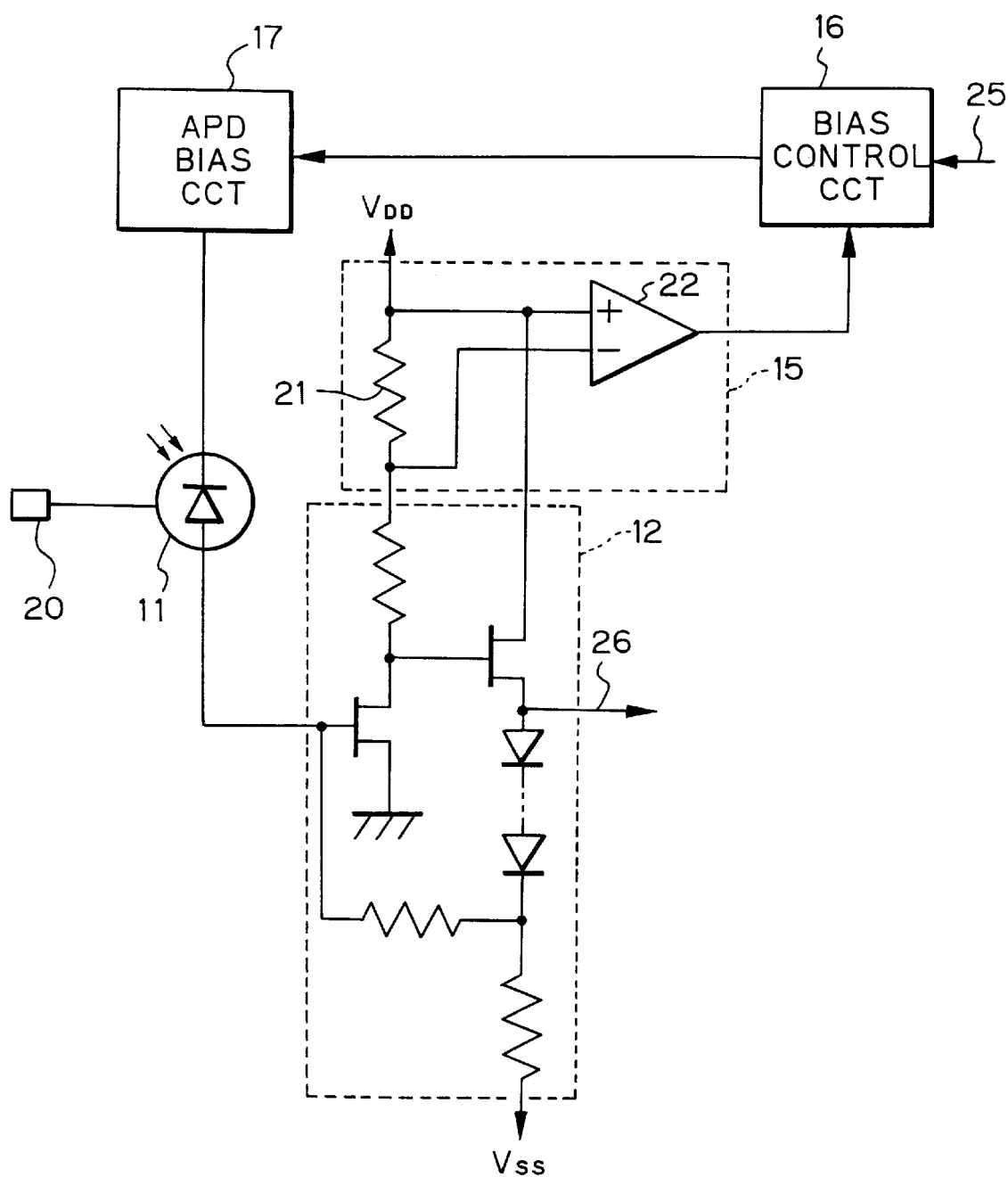
FIG. 4 is a circuit diagram showing a monitor circuit included in the embodiment specifically.

FIG. 4 shows the monitor circuit 15 specifically. In FIG. 4, a signal 25 input to the bias control circuit 16 and a signal 26 output from the preamplifier 12 respectively correspond to the output signal of the AGC control circuit 14, FIG. 2, and the input signal of the AGC amplifier 13, FIG. 2. As shown, the monitor circuit 15 has a resistor 21 and an operational amplifier 22. The circuit 15 feeds to the bias control circuit 16 a voltage signal corresponding to a drain current of a transistor included in the preamplifier 12. Specifically, when the photocurrent of the APD 11 increases, the drain current of the transistor increases due to the rise of the gate potential of a transistor connected to the input of the preamplifier 12. The monitor circuit 15 detects the increase in drain current as an operating point of the preamplifier 12 and outputs it to the bias control circuit 16.

In summary, in accordance with the present invention, an optical receiver monitors the photocurrent of an APD on the basis of the operating point of a preamplifier. Hence, the receiver is capable of protecting its various sections from damage ascribable to an increase in photocurrent with a simple configuration including no special devices.

Various modifications will become possible for those skilled in the art after receiving the teachings of the present disclosure without departing from the scope thereof.

What is claimed is:

1. An optical receiver comprising:

an APD for receiving an optical signal;

a preamplifier for amplifying an electric signal corresponding to the optical signal output from said APD;

an amplifier for amplifying an output of said preamplifier;

first control means for controlling a gain of said amplifier to thereby maintain a signal level output from said amplifier constant, and when the gain of said amplifier becomes maximum, controlling a multiplication ratio of said APD to thereby maintain the signal level output from said amplifier constant;

photocurrent level detecting means for estimating an operating state of said preamplifier to thereby detect a level of a photocurrent of said APD;

decision means for determining whether or not the level of the photocurrent detected by said photocurrent level detecting means is higher than a preselected level; and second control means for causing, when the photocurrent detected is higher than the preselected level, said first control means to stop controlling the multiplication ratio of said APD, and controlling a multiplication ratio of said APD such that the level of the photocurrent detected by said photocurrent level detecting means remains at the preselected level.

2. An optical receiver as claimed in claim 1, wherein said photocurrent level detecting means detects a drain current of a transistor included in said preamplifier.

3. An optical receiver as claimed in claim 1, wherein, when the gain of said amplifier becomes maximum, said first control means varies the multiplication ratio of said APD to maintain the signal level output from said amplifier constant, while keeping the gain of said amplifier at said maximum value.

4. An optical receiver as claimed in claim 1, wherein, when the gain of said amplifier is less than said maximum, only the gain of the amplifier is varied to produce a signal level output from said amplifier which is constant.

5. An optical receiver as claimed in claim 1, wherein said preselected level corresponds to a level of photocurrent which damages at least one circuit of said optical receiver.

6. An optical receiver comprising:

a photodiode for receiving an optical signal;

a preamplifier circuit which amplifies an output of said photodiode;

an amplifier circuit which amplifies an output of said preamplifier;

a control circuit which controls a gain of said amplifier circuit and a multiplication ratio of said photodiode so that an output of said amplifier circuit is maintained at a desired level;

a detecting circuit which detects a current from said photodiode based on an operating state of said preamplifier; and a protection circuit connected to an output of said detecting circuit, wherein, when the gain of said amplifier circuit reaches a predetermined gain and a variation occurs in the output of said amplifier circuit, said control circuit maintains the gain of said amplifier circuit at said predetermined gain and varies a multiplication ratio of said photodiode so that the output of said amplifier circuit remains at said desired level, and wherein, when a magnitude of the detected current from said photodiode exceeds a predetermined level as a result of said control circuit varying the multiplication ratio of said photodiode while said amplifier circuit is maintained at said predetermined gain, said protection circuit sets the multiplication ratio of said photodiode to a constant value for as long as the magnitude of the detected current from said photodiode exceeds said predetermined level, to thereby correct the magnitude of the current from said photodiode back to said predetermined level.

7. An optical receiver as claimed in claim 6, wherein said predetermined gain is a maximum gain of said amplifier circuit.

8. An optical receiver as claimed in claim 7, wherein said photodiode is an avalanche photodiode.

9. An optical receiver as claimed in claim 8, wherein said detecting circuit does not contain a photocoupler.

10. An optical receiver as claimed in claim 8, wherein said detecting circuit detects the current of said photodiode based on a drain current of a transistor included in said preamplifier.

11. An optical receiver as claimed in claim 10, wherein the transistor in said preamplifier includes a gate connected to an input of the preamplifier, and a drain from which the drain current is derived, wherein said detecting circuit includes a resistor having a first terminal connected to the drain of said transistor; and an operational amplifier having an inverting terminal connected to the first terminal of said resistor and a non-inverting terminal connected between a second terminal of said resistor and a power supply, and wherein said operational amplifier outputs a voltage signal which rises with increases in the drain current of said transistor, produced when current input from said photodiode into the gate of said transistor rises, said voltage signal being indicative of a magnitude of the current from said photodiode.

12. An optical receiver as claimed in claim 8, wherein said protection circuit determines whether the magnitude of the detected current from said photodiode exceeds said predetermined level.

13. An optical receiver as claimed in claim 8, wherein, when said control circuit varies the multiplication ratio of said photodiode so that the current from said photodiode exceeds a predetermined level, said protection circuit deactivates control of the multiplication value of said photodiode by said control circuit before controlling the multiplication ratio of said photodiode to correct the magnitude of the current back to said predetermined level.

* * * * *